June 29, 1954 G. W. MOORE Re. 23,842

SLIP ACTUATOR FOR ROTARY DRILLING MACHINES

Original Filed Jan. 15, 1946 7 Sheets-Sheet 1

Inventor

George Waldo Moore.

By H. A. Duckman

Attorney

SLIP ACTUATOR FOR ROTARY DRILLING MACHINES

Original Filed Jan. 15, 1946 7 Sheets-Sheet 2

Inventor
George Waldo Moore.

By H. A. Dreckman
Attorney

SLIP ACTUATOR FOR ROTARY DRILLING MACHINES

Original Filed Jan. 15, 1946 7 Sheets-Sheet 3

Inventor
George Waldo Moore.
By H. A. Duckman
Attorney

June 29, 1954 G. W. MOORE Re. 23,842

SLIP ACTUATOR FOR ROTARY DRILLING MACHINES

Original Filed Jan. 15, 1946 7 Sheets-Sheet 4

Inventor
George Waldo Moore.
By H. A. Dreckman
Attorney

SLIP ACTUATOR FOR ROTARY DRILLING MACHINES

Original Filed Jan. 15, 1946 7 Sheets-Sheet 5

Inventor
George Waldo Moore.
By
H. A. Duckman
Attorney

SLIP ACTUATOR FOR ROTARY DRILLING MACHINES

Original Filed Jan. 15, 1946 7 Sheets-Sheet 6

INVENTOR
George Waldo Moore.
BY
H. A. Duckman
ATTORNEY

SLIP ACTUATOR FOR ROTARY DRILLING MACHINES

Original Filed Jan. 15, 1946 7 Sheets-Sheet 7

INVENTOR
George Waldo Moore.
BY
H. A. Druckman
ATTORNEY

Reissued June 29, 1954 Re. 23,842

UNITED STATES PATENT OFFICE 23,842

SLIP ACTUATOR FOR ROTARY DRILLING MACHINES

George Waldo Moore, Long Beach, Calif., assignor to The National Supply Company, Pittsburgh, Pa., a corporation of Pennsylvania Original No. 2,545,627, dated March 20, 1951, Serial No. 641,272, January 15, 1946. Application for reissue November 26, 1951, Serial No. 258,152

11 Claims. (Cl. 255—23)

Matter enclosed in heavy brackets [ ] appears in the original patent but forms no part of this reissue specification; matter printed in italics indicates the additions made by reissue.

This invention relates to a power means of lifting the slips for disengagement or lowering them for engagement with the drill pipe, casing, tubing or the like in order that the pipe, etc., may be freely raised from or lowered into the well.

An object of my invention is to provide a novel power-operated slip mechanism to perform the functions related above and which will permit rotation of the pipe, etc., and the rotary table while the slips are in the lowered position and engaged with the pipe and suspending the pipe in the well.

An object of my invention is to provide a novel power actuated slip actuator which is used in connection with the standard rotary drilling machine, and which does not alter the operation or use of said drilling machine.

Another object of my invention is to provide a novel power slip actuator for rotary drilling machines which lowers the slips for contact and engagement with the pipe, or raises the slips for free passage of the pipe through the rotary table, from above, thus following the standard procedure in moving the slips.

A feature of my invention is that my slip actuator may be attached to or mounted upon the usual rotary drilling machine without materially changing or altering the character of said machine.

Other objects, advantages and features of invention may appear from the accompanying drawing, the subjoined detailed description, and the appended claims.

Figure 2:
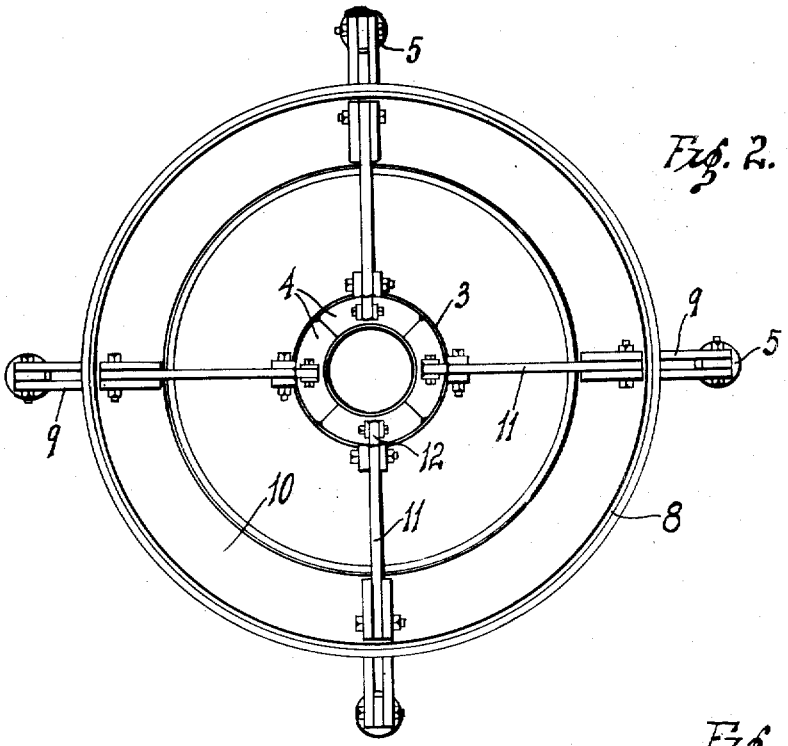
Figure 2 is a top plan view of the same.

Referring more particularly to the drawing, the numeral 1 indicates a rotary drilling machine of usual and well-known construction, and the drive details are of no moment as far as this application is concerned. The only structural parts which are of interest will be subsequently described. The main frame or housing 2 of the drilling machine is a large heavy casting and is mounted on the floor of the derrick in the usual and well-known manner. The tapered slip seat or master bushing 3 is also usual and well-known, and this slip seat is rotated by the power drive extending to the rotary table, and again this structure is usual and well-known. The slips 4, which engage the pipe tubing, drill stem or the like, fit in the seat 3, and when the slips are in the lowermost position they are gripping the pipe or the like. When the slips are moved upwardly, they follow the taper or seat 3 and thus move away from the pipe or the like to disengage the same. In ordinary practice, there are usually three or four slips seated within the master bushing 3, and these slips cause the pipe, drill stem or the like to rotate with the moving part of the rotary drilling machine. When it is necessary to raise or remove the pipe from the well as it is suspended by the slips, the custom is to halt the withdrawal of the pipe at a point when a joint is a short distance above the rotary table. The slips are then inserted in the master bushing to engage with the pipe, which is then lowered a short distance into the well until the teeth of the slips are imbedded sufficiently in the exterior of the pipe to support the section of pipe remaining in the well. A wrench, or tong, called a "breakout," is then engaged with the uppermost part of the joint to be unscrewed, and another tong, called a "backup" is engaged with the lowermost portion of the joint in order to resist rotation of the pipe when the breakout tong is moved to unscrew the connection. The use of a backup tong is necessary when the grip of the slips is not sufficient to resist rotation of the pipe hanging in the well. Leverage is exerted on the breakout tong by means of a cat line engaged with a revolving cathead, or automatic type cathead, until the joint is broken to the extent that the joint, which is usually of a tapered design, may be readily unscrewed. When the joint has been broken, the unscrewing operation is completed and speeded up by disengaging the backup tong, if one is used, and then rotating the rotary table while the breakout tong acts in fact as a backup, as it is now the section of pipe hanging in the derrick which remains stationary and the section of pipe remaining in the well which is rotated. The free section of pipe is then either laid down or set back in the derrick, the elevators disengaged and lowered for connection to the pipe extending above the rotary table for hoisting into the derrick whence the operation is repeated.

When it is necessary to lower the pipe into the well, the procedure is to first raise the pipe from the hoisted mechanism sufficiently far enough to take the load off of the slips after a new section has been screwed into the pipe hanging in the slips, far enough to take the load off of the slips. This action will free the slips from engagement with the pipe to the extent that the slips may be withdrawn from the tapered bowl of the master bushing and the pipe lowered into the well without interference from the slips.

Figure 1:
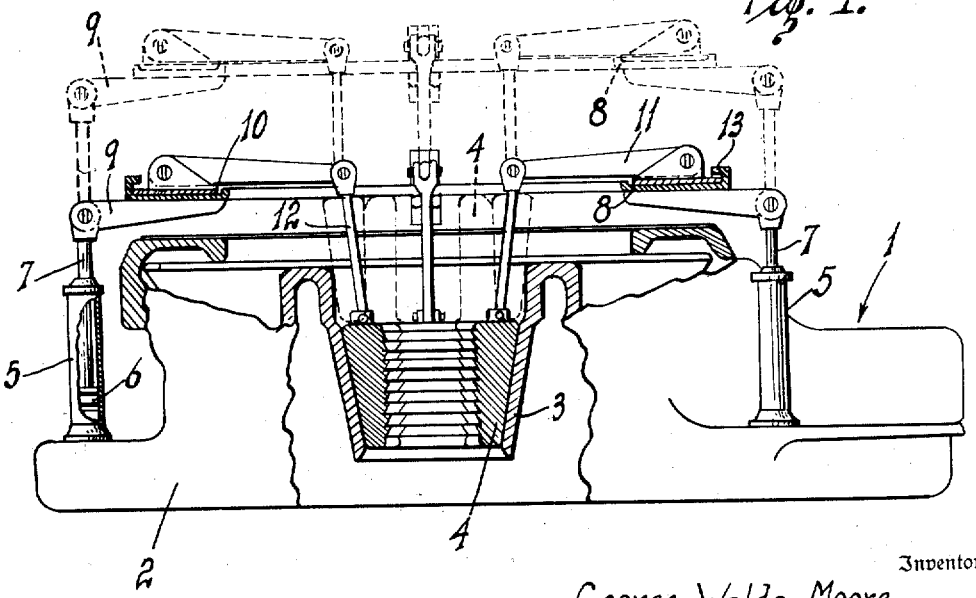
Figure 1 is a side elevation of my slip actuator mounted on a rotary drilling machine and with parts broken away to show interior construction.

Considering first the modification shown in Figures 1 and 2, a plurality of hydraulic or pneumatic cylinders 5 are fixedly mounted on the base or frame 2 of the rotary table. Each cylinder includes a piston 6 and a piston rod 7. A slip ring or track 8 is positioned above the rotary table 1, and is of a sufficient diameter to lie at approximately the outer periphery of the rotary table. A supporting arm 9 extends from each of the piston rods 7 to the track 8. These supporting arms are fixedly attached to the upper end of the piston rods and also to the bottom of the track 8. It will thus be evident that the track 8 is non-rotatably held above the upper face of the rotary table, but it can be moved vertically when the hydraulic or pneumatic cylinders 5 are actuated. The raised position of the track is shown in dotted lines in Figure 1. A slip ring 10 is mounted in the track 8, and this slip ring moves with the rotating part of the rotary table—that is, it is dragged around as the slips rotate, as will be subsequently described. A plurality of arms 11 extend horizontally from the slip ring 10, and a link 12 is pivotally secured to the outer end of each arm 11 and extends downwardly, and is pivotally attached to the upper end of one of the slips 4—that is, there is one link 12 for each slip. It will be evident that when the track 8 is lifted, as shown in dotted lines in Figure 1, the links 12 will pull the slips upwardly as shown in dotted lines in Figure 1. When the slips are thus pulled upwardly and outwardly, the pipe, casing or drill stem will be released and can be moved as required. The edges of the track 8 may overhang the slip ring 10, as shown at 13, so that the slips can be pushed downwardly to a seated position by power means—that is, by actuating the power cylinders 5. In other words, the track not only lifts the slips, but also can serve to push them downwardly to a seated position.

Figure 7:
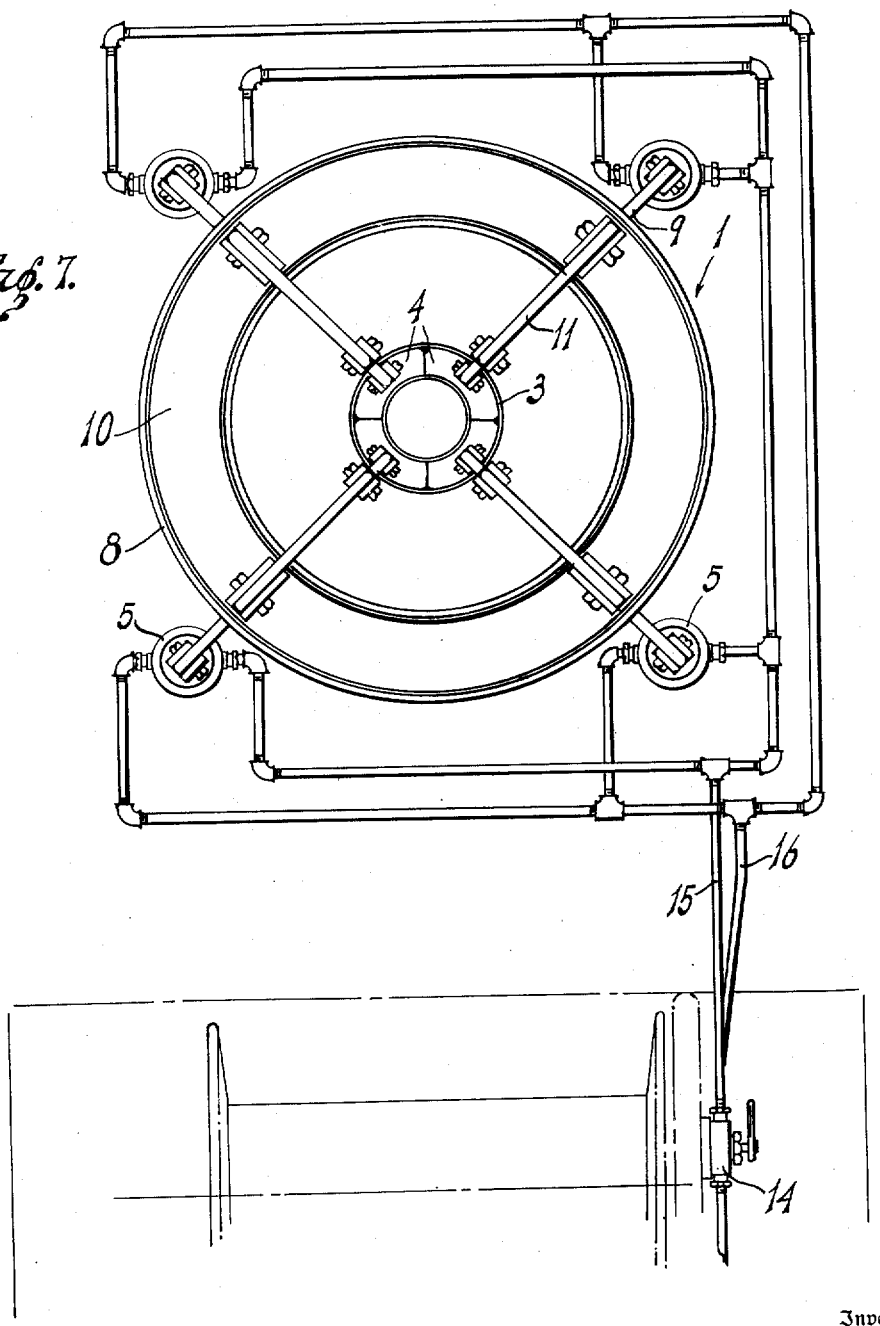
Figure 7 is a top plan view of the slip actuator showing the piping necessary to actuate the hydraulic or pneumatic cylinders.

In Figure 7, I have shown the pipe lines necessary to conduct a pressure fluid to the various cylinders. A control valve 14 is mounted at some point close to where the driller will stand, and from this control valve extend the pressure line 15 and the return line 16. The pressure line 15 extends to all of the cylinders 5, and similarly the return line 16 extends from all of the cylinders and thence back to the valve.

Figure 4:
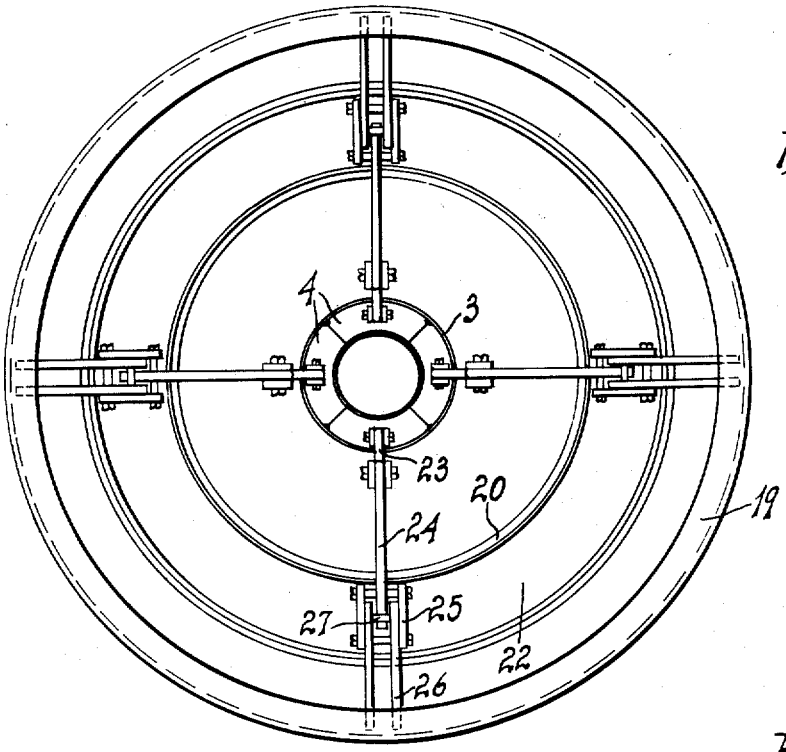
Figure 4 is a top plan view of the structure shown in Figure 3.
Figure 3:
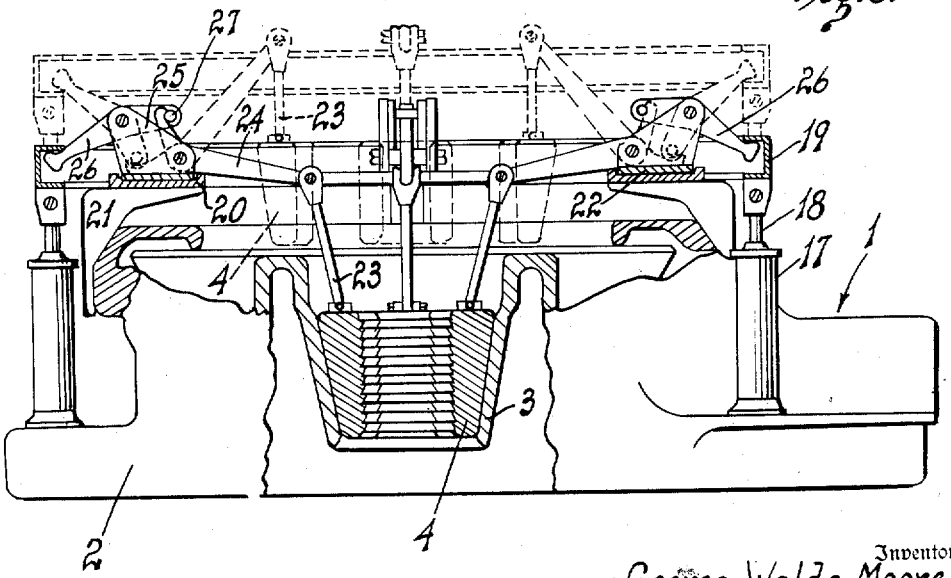
Figure 3 is a side elevation similar to Figure 1, and showing a modified form of slip actuator.

In Figures 3 and 4, a modified means of raising the slips 4 is shown, and consists of a plurality of hydraulic or pneumatic cylinders 17 each cylinder including a piston rod 18. A channel ring 19 is fixedly mounted on the upper ends of the piston rods 18—that is, the channel ring 19 is moved vertically when the cylinders 17 are actuated as shown in dotted lines in Figure 3. A track 20 is mounted on brackets 21, which brackets are attached to the stationary frame or housing 2 of the rotary table. A slip ring 22 is seated in the track 20 and is dragged around in this track as the rotating part of the table moves. A link 23 is pivotally attached to the upper end of each of the slips 4 and this link is also pivotally attached to the outer end of a bell crank 24. The bell crank 24 is also pivoted to a bracket 25 on the ring 22. An operating lever 26 is also pivotally attached to the bracket 25, and one end of this lever extends into the channel 19 and the other end is provided with a pin 27, which pin engages the outer end of the bell crank 24. The dotted line position in Figure 3 will show the manner in which lever 26 swings the bell crank 24 in order to move the slips 4 into the raised or disengaged position.

Figure 6:
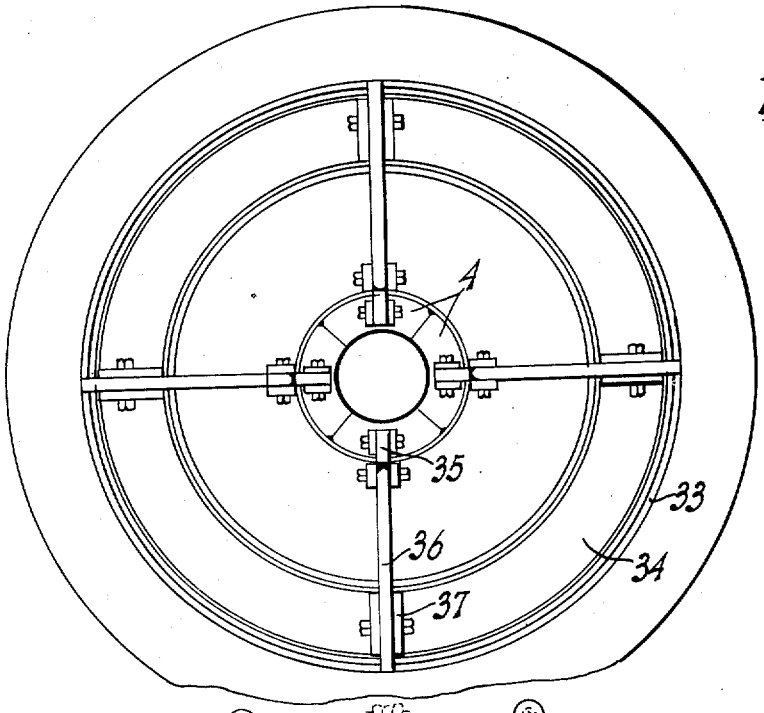
Figure 6 is a top plan view of the structure shown in Figure 5.
Figure 5:
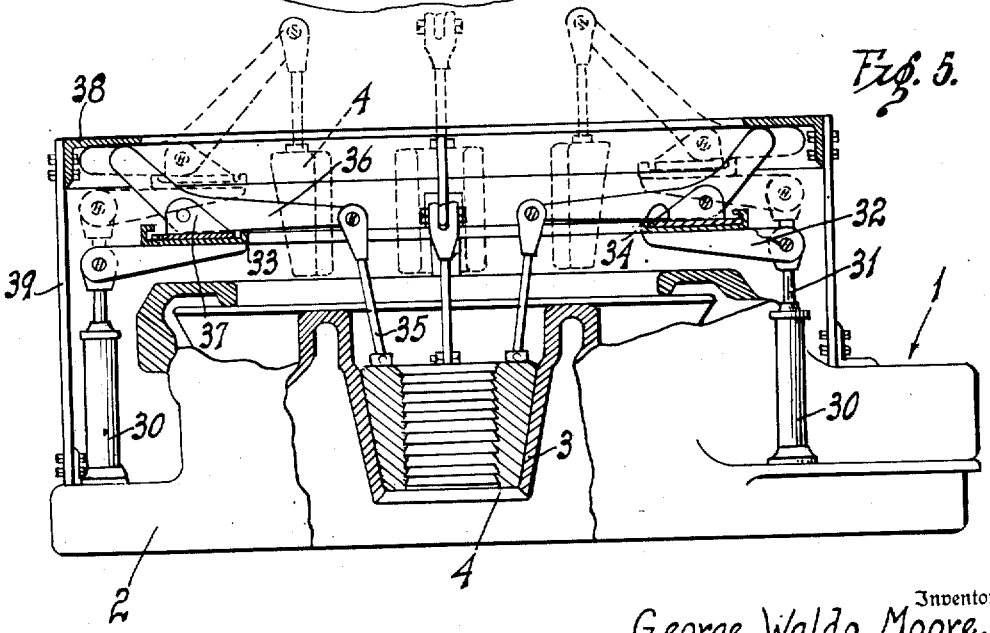
Figure 5 is a view similar to Figure 1, and showing still another modified form of slip actuator.

In Figures 5 and 6 still another modified form of my invention is disclosed in which the pneumatic or hydraulic cylinders 30 are mounted on the frame 2 of the rotary table. Each cylinder includes a piston rod 31, and an arm 32 is fixedly secured to the piston rod 31 and supports an annular track 33. A slip ring 34 slides in the track 33 in the same manner as previously described. Each of the slips 4 is provided with a link 35, which is pivotally attached to the top of the slip and also to the inner end of a bell crank 36. The bell cranks 36 are each pivotally mounted on brackets 37 on the slip ring 34. A stationary cam ring 38 is mounted on arms 39, which rise from the frame of the rotary table. The outer or swinging end of the bell crank 36 engages the cam 38, and when the bell crank is moved upwardly, it will swing around its pivot causing the slips 4 to be moved upwardly and outwardly, as shown in dotted lines in Figure 5.

Figure 9:
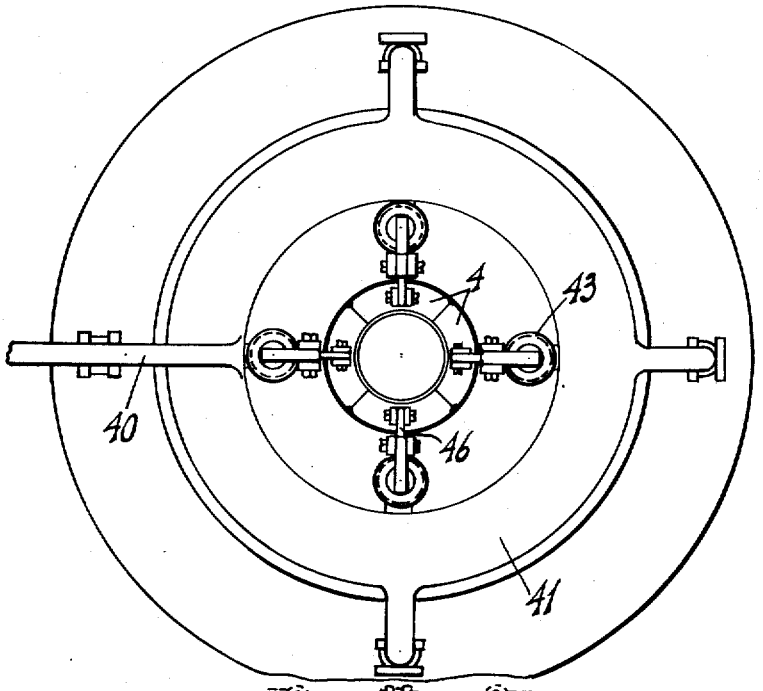
Figure 9 is a top plan view of the same.
Figure 8:
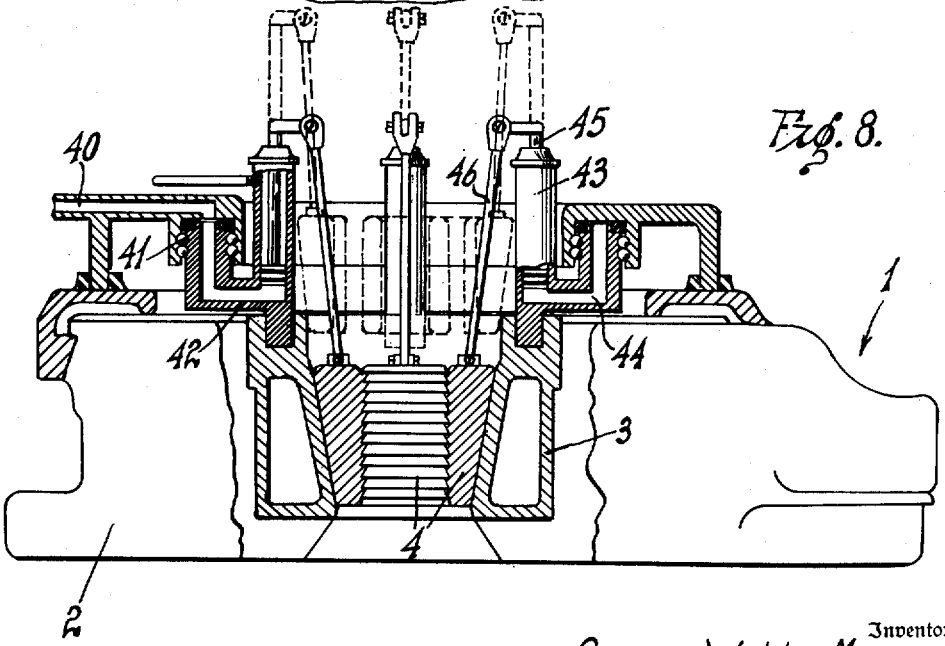
Figure 8 is a side elevation of still another modified form of slip actuator, and with parts broken away to show interior construction.

In Figures 8 and 9, I have shown still another modified form of moving the slips 4, and consisting of a stationary pressure conduit 40. This conduit includes an annular bearing 41, which bearing receives a rotating ring 42 mounted on or attached to the rotating part of the drilling machine or the master bushing 3. A plurality of pistons 43 are mounted on or integrally formed with the ring 42. A conduit 44 in the ring 42 is open to the conduit 40 and thus carries pressure to each of the cylinders 43. The piston rod 45 of each cylinder 43 is pivotally attached to a link 46, which extends to one of the slips 4. Thus, when fluid pressure is conducted through the conduit 40, the cylinders 43 will be simultaneously actuated, thus raising the piston rods 45 and the links 46, causing the slips to be removed upwardly to the position shown in dotted lines in Figure 8.

Figure 11:
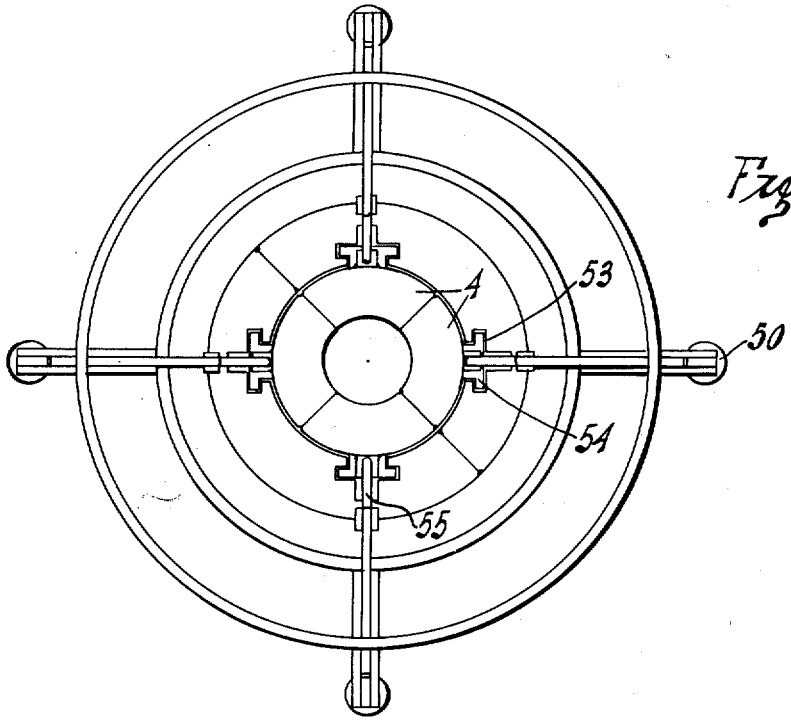
Figure 11 is a top plan view of the structure shown in Figure 10.
Figure 10:
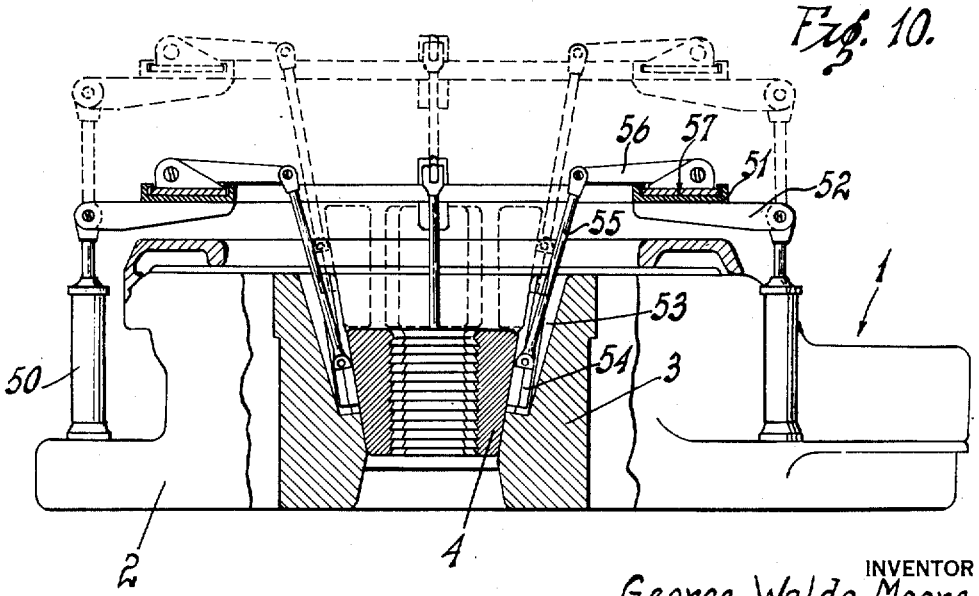
Figure 10 is a side elevation of a further modified form of slip actuator, and with parts broken away to show interior construction.

The modification shown in Figures 10 and 11 is very similar to the structure shown in Figures 1 and 2, with the exception that the slips are keyed to the master bushing and move in a key way, as will be subsequently described. The stationary cylinders 50 support an annular race 51 on arms 52. The master bushing 3 is provided with a key way 53 for each of the slips 4. The slips are each provided with a lug 54, which fits in the key way 53. The links 55 are secured at one end to the lugs 54 and at the other end to an arm 56 mounted on the slip ring 57, all as previously described in the detailed description of Figures 1 and 2. The slips when they move vertically will move in the key way 53, and thus will be moved outwardly in a more accurate manner and the pipe or other part which is gripped by the slip will be more effectively released.

Figure 13:
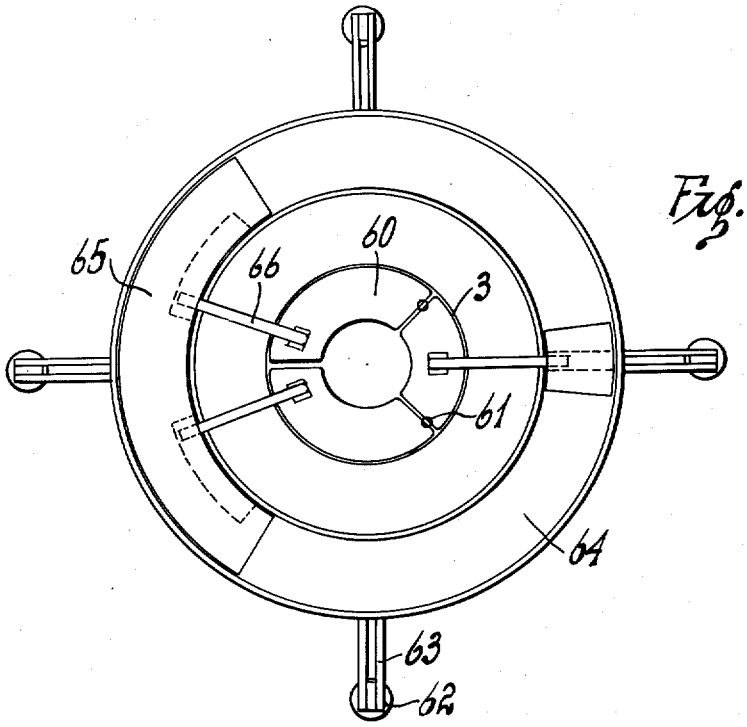
Figure 13 is a top plan view of the structure shown in Figure 12.
Figure 12:
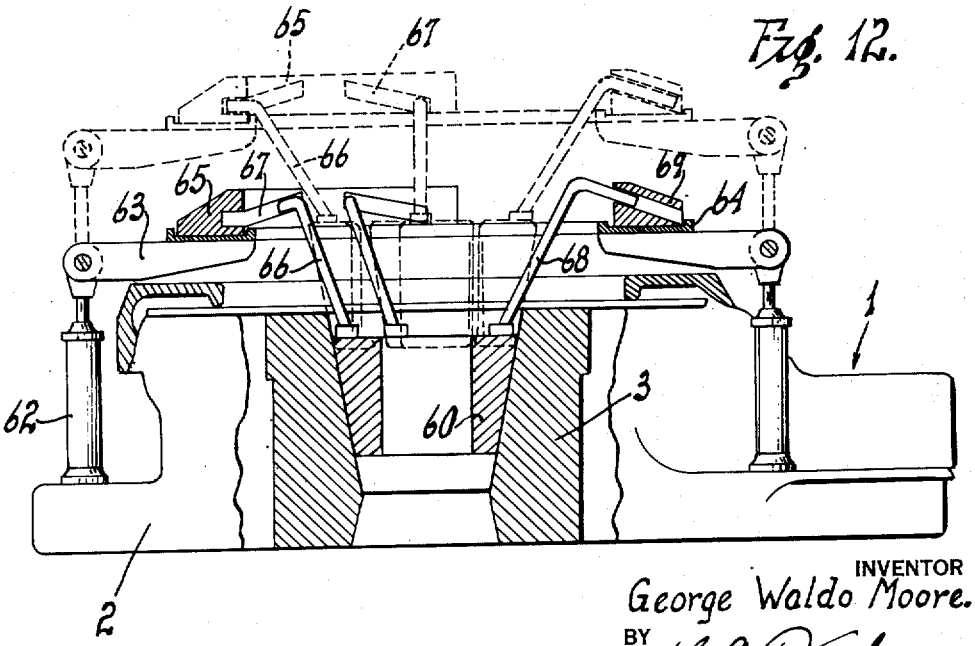
Figure 12 is still another modified form of slip actuator and with parts broken away to show interior construction.

In Figures 12 and 13, I have shown a means of actuating slips, which require not only vertical movement for disengagement but also a swinging movement in that the slips are hinged together, and it is necessary to swing the slips around these hinges when the pipe is disengaged. The slip structure 60 is usual and well-known in the art, and two of the slips are hinged to a third slip, as shown at 61. The cylinders 62 are stationary and are mounted on the frame 2 of the rotary table. Each cylinder is provided with an arm 63, which supports a track 64. The track is stationary insofar as rotary motion is concerned. However, the track is moved vertically when the cylinders are actuated, the raised position of the track being shown in dotted lines in Figure 12. A cam block 65 is mounted in the track 64 and slides therein, being dragged around with the master bushing 3 by means of links 66, which are attached at one end to the slips 60 and the other end extending into cam slots 67. The cam slots 67 impart a partial rotation to the slips 60 when the track 64 is raised. One of the slips 60 is not rotated but is merely moved outwardly or inwardly relative to the center line of the table, and this slip has a separate link 68, the upper end of which slides into a block 69. In the modification last described, the slips are not only moved upwardly and outwardly, but are also swung radially around a pivot in order to disengage the slips from the pipe.

Having described my invention, I claim:

[1. In combination with a rotary drilling table, a stationary main frame on which said table is rotatably supported, a rotatable slip seat integrally formed with said table and positioned in the center of said table, slips positioned on said seat, a plurality of vertical power cylinders fixedly mounted on said frame and adjacent the periphery of the frame, a piston rod in each power cylinder, an annular track above said drilling table, and concentric with said slip seat, said piston rods supporting the annular track, a slip ring slidably mounted on the track, links mounted on the slip ring and extending inwardly and downwardly from said slip ring and attached to said pipe engaging slips.]

[2. In combination with a rotary drilling table, a stationary main frame on which said table is rotatably supported, a rotatable slip seat integrally formed with said table and positioned in the center of said table, slips positioned on said seat, a plurality of vertical power cylinders fixedly mounted on said frame and adjacent the periphery of the frame, a piston rod in each power cylinder, an annular track above said drilling table, and concentric with said slip seat, said piston rods supporting the annular track, a slip ring slidably mounted on the track, links mounted on the slip ring and extending inwardly and downwardly and attached to said pipe engaging slips, said links moving the pipe engaging slips upwardly and outwardly to disengage and free the pipe when said power cylinders are actuated.]

[3. In combination with a rotary drilling table, a stationary main frame on which said table is rotatably supported, a rotatable slip seat integrally formed with said table and positioned in the center of said table, slips positioned on said seat, a plurality of vertical power cylinders fixedly mounted on said frame and adjacent the periphery of the frame, a piston rod in each power cylinder, an annular track above said drilling table and concentric with said slip seat, said piston rods supporting the annular track, a slip ring slidably mounted on the track, links mounted on the slip ring and extending inwardly and downwardly from said slip ring and attached to said pipe engaging slips, all of said power cylinders being simultaneously actuated.]

[4. In combination with a rotary drilling table, a stationary main frame on which said table is rotatably supported, a rotatable slip seat integrally formed with said table and positioned in the center of said table, slips positioned on said seat, a plurality of vertical power cylinders fixedly mounted on said frame and adjacent the periphery of the frame, a piston rod in each power cylinder, an annular track above said drilling table and concentric with said slip seat, said piston rods supporting the annular track, a slip ring slidably mounted on the track, links mounted on the slip ring and extending inwardly and downwardly from said slip ring and attached to said pipe engaging slips, an annular lip formed on the outer edge of said track and extending inwardly, said lip engaging said ring whereby the ring, the links and the slips are urged downwardly with said track.]

*5. In combination with a rotary drilling table, a stationary main frame on which said table is rotatably supported, a rotatable slip seat integrally formed with said table and positioned in the center of said table, slips positioned on said seat, a plurality of vertical power cylinders fixedly mounted on said frame and adjacent the periphery of the frame, a piston rod in each power cylinder, an annular track above said drilling table, and concentric with said slip seat, said piston rods supporting the annular track, a slip ring slidably mounted on the track, links mounted on the slip ring and extending inwardly and downwardly from said slip ring and attached to said pipe engaging slips.*

*6. In combination with a rotary drilling table, a stationary main frame on which said table is rotatably supported, a rotatable slip seat integrally formed with said table and positioned in the center of said table, slips positioned on said seat, a plurality of vertical power cylinders fixedly mounted on said frame and adjacent the periphery of the frame, a piston rod in each power cylinder, an annular track above said drilling table, and concentric with said slip seat, said piston rods supporting the annular track, a slip ring slidably mounted on the track, links mounted on the slip ring and extending inwardly and downwardly and attached to said pipe engaging slips, said links moving the pipe engaging slips upwardly and outwardly to disengage and free* the pipe when said power cylinders are actuated.

7. In combination with a rotary drilling table, a stationary main frame on which said table is rotatably supported, a rotatable slip seat integrally formed with said table and positioned in the center of said table, slips positioned on said seat, a plurality of vertical power cylinders fixedly mounted on said frame and adjacent the periphery of the frame, a piston rod in each power cylinder, an annular track above said drilling table and concentric with said slip seat, said piston rods supporting the annular track, a slip ring slidably mounted on the track, links mounted on the slip ring and extending inwardly and downwardly from said slip ring and attached to said pipe engaging slips, all of said power cylinders being simultaneously actuated.

8. In combination with a rotary drilling table, a stationary main frame on which said table is rotatably supported, a rotatable slip seat integrally formed with said table and positioned in the center of said table, slips positioned on said seat, a plurality of vertical power cylinders fixedly mounted on said frame and adjacent the periphery of the frame, a piston rod in each power cylinder, an annular track above said drilling table and concentric with said slip seat, said piston rods supporting the annular track, a slip ring slidably mounted on the track, links mounted on the slip ring and extending inwardly and downwardly from said slip ring and attached to said pipe engaging slips, an annular lip formed on the outer edge of said track and extending inwardly, said lip engaging said ring whereby the ring, the links and the slips are urged downwardly with said track.

9. A slip assembly, comprising: a plurality of pipe engaging slips, a plurality of vertical power cylinders, a piston rod in each power cylinder, an annular track above said slips and concentric with said slips, said piston rods supporting the annular track, a slip ring movably mounted on the track, the slip ring and track having a central opening of substantially greater size than the minimum outer dimension of the slips in pipe-gripping position, and links mounted on the slip ring and extending inwardly and downwardly through said opening in said slip ring and attached to said pipe engaging slips.

10. A slip assembly, comprising: a plurality of pipe engaging slips, a plurality of vertical power cylinders, a piston rod in each power cylinder, an annular track above said slips and concentric with said slips, said piston rods supporting the annular track, a slip ring movably mounted on the track, the slip ring and track having a central opening of substantially greater size than the minimum outer dimension of the slips in pipe-gripping position, and links mounted on the slip ring and extending inwardly and downwardly through said opening and attached to said pipe engaging slips, said links being arranged to move the pipe engaging slips upwardly and outwardly to disengage and free the pipe when said power cylinders are actuated.

11. A slip assembly, comprising: a plurality of pipe engaging slips, a plurality of vertical power cylinders, a piston rod in each power cylinder, an annular track above said slips and concentric with said slips, said piston rods supporting the annular track, the slip ring and track having a central opening of substantially greater size than the minimum outer dimension of the slips in pipe-gripping position, a slip ring movably mounted on the track, links mounted on the slip ring and extending inwardly and downwardly through said opening in said slip ring and attached to said pipe engaging slips, and control means for said power cylinders for simultaneously actuating the pistons thereof.

12. A slip assembly, comprising: a plurality of pipe engaging slips, a plurality of vertical power cylinders, a piston rod in each power cylinder, an annular track above said slips and concentric with said slips, said piston rods supporting the annular track, the slip ring and track having a central opening of substantially greater size than the minimum outer dimension of the slips in pipe-gripping position, a slip ring movably mounted on the track, and links mounted on the slip ring and extending inwardly and downwardly through said opening in said slip ring and attached to said pipe engaging slips, said track having an annular lip formed on the outer edge thereof and extending inwardly, said lip engaging said ring, whereby the ring, the links and the slips are urged downwardly with said track.

13. A slip assembly, comprising: a plurality of pipe engaging slips, an annular horizontal track above said slips and concentric with said slips, fluid actuated power means, said power means including vertically slidable lift elements spaced about the periphery of the annular track and operatively connected to raise and lower said annular track while holding said track rigidly in a horizontal position, a slip ring mounted on the track for turning movement relative thereto, the slip ring and track having a central opening of substantially greater size than the minimum outer dimension of the slips in pipe-gripping position, and links mounted on the slip ring and extending inwardly and downwardly through said opening in said slip ring and attached to said slips.

14. A slip assembly, comprising: a plurality of pipe engaging slips; an annular horizontal non-rotary support above said slips and concentric with said slips; a slip ring mounted on the annular support for rotary movement relative thereto, the slip ring and annular support having a central opening of substantially greater size than the minimum outer dimension of the slips in pipe-gripping position; a plurality of links each pivotally mounted on the slip ring and extending inwardly and downwardly through said opening in said slip ring and each pivotally attached to one of said slips; fluid actuated power cylinder means; vertically slidable lift means actuated by said cylinder means positioned outwardly of the slips; and means operative for aiding in positively holding the annular support in a level horizontal position, said last-mentioned means being operatively disposed between the annular support and the vertical lift means.

15. In combination with a rotary machine having a stationary frame and a table structure rotatably mounted upon the frame and provided with a rotatable slip seat; a plurality of pipe gripping slips adapted to be moved into contact with said seat and rotate therewith to support and rotate a central pipe; a plurality of downwardly extending links, the lower end of each link being pivotally connected to one of said slips; a plurality of radially extending arms, the inner end of each arm being pivotally connected to the upper end of one of said links; means for simultaneosuly raising and lowering said arms including a lift member, a rotatable ring member supported thereon, and at least three vertically slidable elements fixed to one of said mem-

*bers; and fluid actuated power cylinder means positioned outwardly of the slips and ring member and operative to effect simultaneous and equal movement of said vertically slidable elements, whereby the member fixed to said vertically slidable elements is positively maintained in a level horizontal position and prevented from tilting.*

References Cited in the file of this patent or the original patent

UNITED STATES PATENTS

| Number | Name | Date |
|---|---|---|
| 1,341,702 | Black | June 1, 1920 |
| 1,656,864 | Martin | Jan. 17, 1928 |
| 1,812,721 | Sheldon | June 30, 1931 |
| 1,883,073 | Stone | Oct. 18, 1932 |
| 2,076,042 | Penick et al. | Apr. 6, 1937 |
| 2,109,546 | McLagan | Mar. 1, 1938 |
| 2,340,597 | Kelley | Feb. 1, 1944 |